(12) United States Patent
Jericho et al.

(10) Patent No.: US 9,052,209 B2
(45) Date of Patent: Jun. 9, 2015

(54) LOCATION SERVICES IN MINING VEHICLE OPERATIONS

(71) Applicant: Caterpillar Inc., Peoria, IL (US)

(72) Inventors: Veronica Jericho, Queensland (AU); Glen Blanchard, Upper Coomera (AU); Nicolas Noben, Highgate Hill (AU); Cameron Singe, Tullamerine (AU)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 14/035,049

(22) Filed: Sep. 24, 2013

(65) Prior Publication Data

US 2014/0088820 A1    Mar. 27, 2014

Related U.S. Application Data

(60) Provisional application No. 61/704,886, filed on Sep. 24, 2012, provisional application No. 61/710,331, filed on Oct. 5, 2012.

(51) Int. Cl.
| | |
|---|---|
| *G07C 5/00* | (2006.01) |
| *G01C 21/34* | (2006.01) |
| *G06F 11/30* | (2006.01) |
| *G06Q 10/06* | (2012.01) |
| *G06Q 50/02* | (2012.01) |
| *G07C 5/08* | (2006.01) |

(52) U.S. Cl.
CPC ............ *G01C 21/3407* (2013.01); *G06F 11/30* (2013.01); *G07C 5/00* (2013.01); *G06Q 10/06316* (2013.01); *G06Q 50/02* (2013.01); *G07C 5/008* (2013.01); *G07C 5/0825* (2013.01)

(58) Field of Classification Search
USPC .................................. 701/32.3, 32.5, 50, 465
See application file for complete search history.

(56) References Cited

U.S. PATENT DOCUMENTS

| | | | | |
|---|---|---|---|---|
| 6,484,078 | B1 * | 11/2002 | Kageyama ...................... 701/25 |
| 7,283,810 | B1 * | 10/2007 | Arakawa et al. ............. 455/414.1 |
| 7,693,633 | B2 * | 4/2010 | Donnelli et al. ................ 701/50 |
| 2009/0088979 | A1 * | 4/2009 | Koch ............................ 701/224 |
| 2011/0230205 | A1 * | 9/2011 | Olson ........................ 455/456.1 |
| 2012/0136524 | A1 * | 5/2012 | Everett et al. ................... 701/24 |
| 2014/0032061 | A1 * | 1/2014 | Wulf et al. ...................... 701/51 |

* cited by examiner

*Primary Examiner* — Yonel Beaulieu
(74) *Attorney, Agent, or Firm* — Miller, Matthias & Hull LLP (57) ABSTRACT

A system of computers, wireless networks, and vehicle-based location sensors allows real time display of equipment location, utilization, and expected arrival times for mobile vehicles. Display of location by load status and expected arrival time allows monitoring of not just vehicle location but the impact on queue times at loading and unloading endpoints allowing for equipment reallocation. Overhead map views of actual location including hazard locations and queries for vehicle and operator status are also supported.

20 Claims, 12 Drawing Sheets

LOCATION SERVICES IN MINING VEHICLE OPERATIONS

RELATED CASES

This application claims priority to U.S. Provisional Patent Application No. 61/710,331 filed Oct. 5, 2012 and U.S. Provisional Patent Application No. 61/704,886 filed Sep. 24, 2012, both of which are incorporated by reference for all purposes.

TECHNICAL FIELD

The current disclosure is generally related to use of location information in mining mapping and location services and more particularly to the use of location information in managing vehicle operations in a mining environment.

BACKGROUND

Mining is a complex operation. It requires large machines to undertake challenging tasks that are potentially dangerous. The machine can be hard to maneuver, the environment may be full of dangers and the machines are under significant stress.

At the same time, efficiency is becoming more and more important to mining operations. The cost of fuel is becomes a major factor as the distances that trucks travel between extraction equipment and unloading points can be significant. When trucks encounter long delays at endpoints while waiting to load or unload can further reduce efficiency in both unproductive equipment usage and idle fuel consumption. Conversely, extraction or processing equipment at endpoints that is idle while waiting for trucks to arrive further reduces efficiency.

Existing mine mapping equipment may provide location of vehicles but does not give a comprehensive view of the environment with respect to endpoint status and future expected states. Current systems do not provide a comprehensive view of expected arrival times, current queue times, and machine efficiencies, nor support real time operational guidance based on those inputs.

SUMMARY

In a first aspect, a method of using vehicle location information in a mining environment includes generating, at a processor of a computer, a timeline having an expanded portion adjoining and not overlapping a compressed portion. The compressed portion represents more time per unit length than the expanded portion. The timeline may have a first end corresponding to a first location of a first work function and a second end corresponding to a second location of a second work function. The method may also display the timeline on a display of the computer, via a processor, responsive to executable instructions stored in a memory accessible by the computer. The method may also include receiving location, direction, and speed information from a work vehicle at the computer, determining a destination of the work vehicle as one of the first location and the second location, calculating an estimated travel time for the work vehicle to reach the destination, and displaying an icon showing the location of the work vehicle at a point on the timeline corresponding to the travel time remaining for the work vehicle to reach the destination.

In another aspect, a system for integrating information about a vehicle operating in a mining environment may have an operator system including a network connection configured to receive location information about a vehicle operating in the mining environment, a processor configured to execute program instructions, a user interface having a display and input device, and a memory storing computer executable instructions. When the instructions are executed on the processor it may cause the operator system to receive location information about the vehicle in near real time, receive incident information about the vehicle in near real time, store the location information and the incident information for the vehicle operating in the mining environment, and generate a first map showing a current location of the vehicle and any current incident information. The system may also generate a second map displaying a playback of vehicle location and incident information over time using the stored tracking and incident data.

In yet another aspect, a method of integrating information at a computer about a vehicle operating in a mining environment may include connecting an operator system to a network, receiving, at the computer via the network, location and speed information about the vehicle in near real time, receiving, at the computer via the network, incident information about the vehicle in near real time, displaying the location of the vehicle on an overhead map of the mining environment, calculating, using a processor of the computer and the location and speed information, an expected time of arrival at a destination. The method may also include displaying a timeline showing the location of the vehicle at a point that is a function of the expected time of arrival. The timeline may have two endpoints representing destinations of a loading location and of a discharge location for the vehicle.

DETAILED DESCRIPTION

Figure 1:
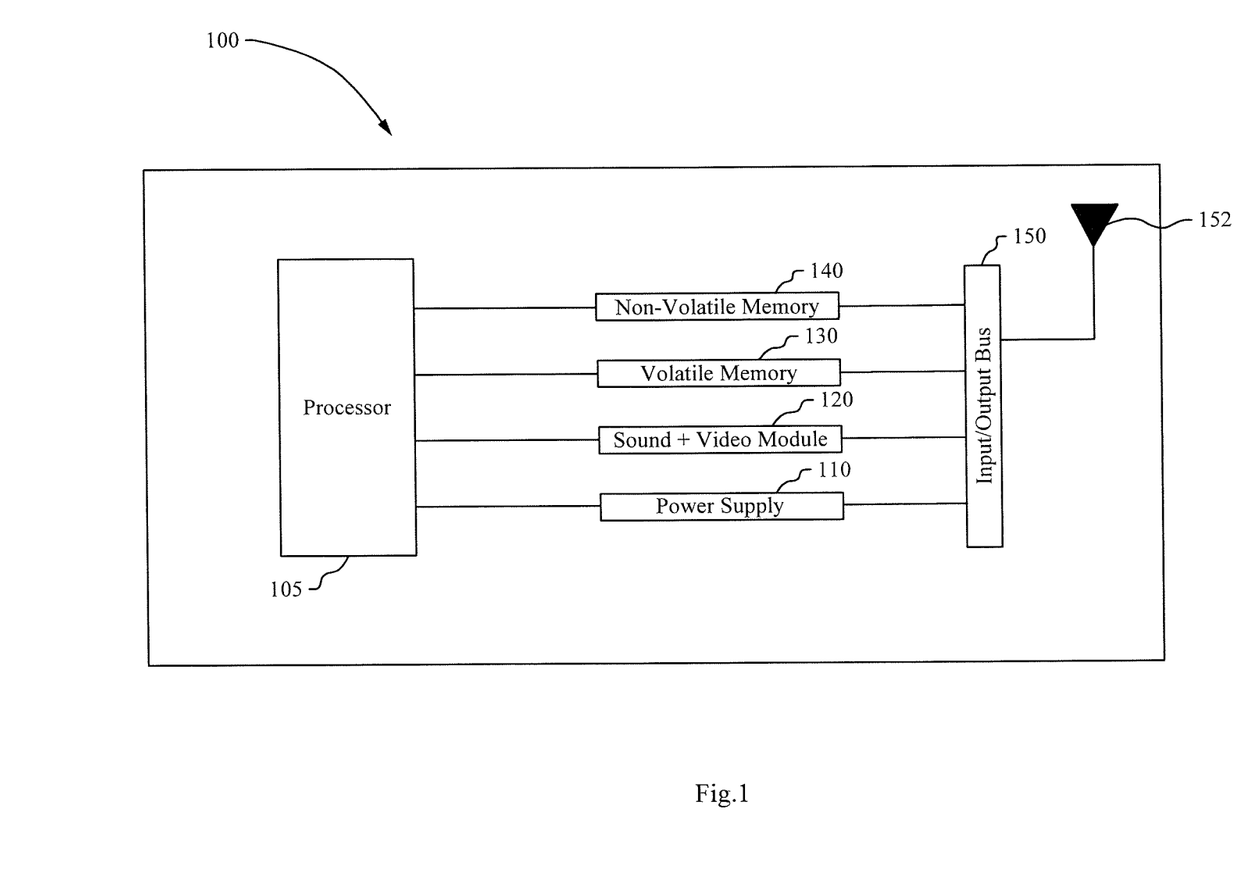
FIG. 1 is an illustration of a portable computing device.

FIG. 1 may be a high level illustration of some of the elements of a sample computing system. The computing system may be a dedicated computing device, a dedicated portable computing device, an application on the computing device, an application on the portable computing device or a combination of all of these.

FIG. 1 may be a sample portable computing device 100 that is physically configured according to be part of the system. The portable computing device 100 may have a processor 105 that is physically configured according to computer executable instructions. It may have a portable power supply 110 such as a battery which may be rechargeable. It may also have a sound and video module 120 which assists in displaying video and sound. The device 100 may turn off when not in use to conserve power and battery life. The portable computing device 100 may also have volatile memory 130 and non-volatile memory 140. There also may be an input/output bus 150 that shuttles data to and from the various user input devices such as a microphone, the inputs, etc. It also may control communicating via one or more networks, either through a wired interface (not depicted) or a wireless interface 152. Of course, this is just one embodiment of the portable computing device 100 and the number and types of portable computing devices 100 is limited only by the imagination.

Figure 2:
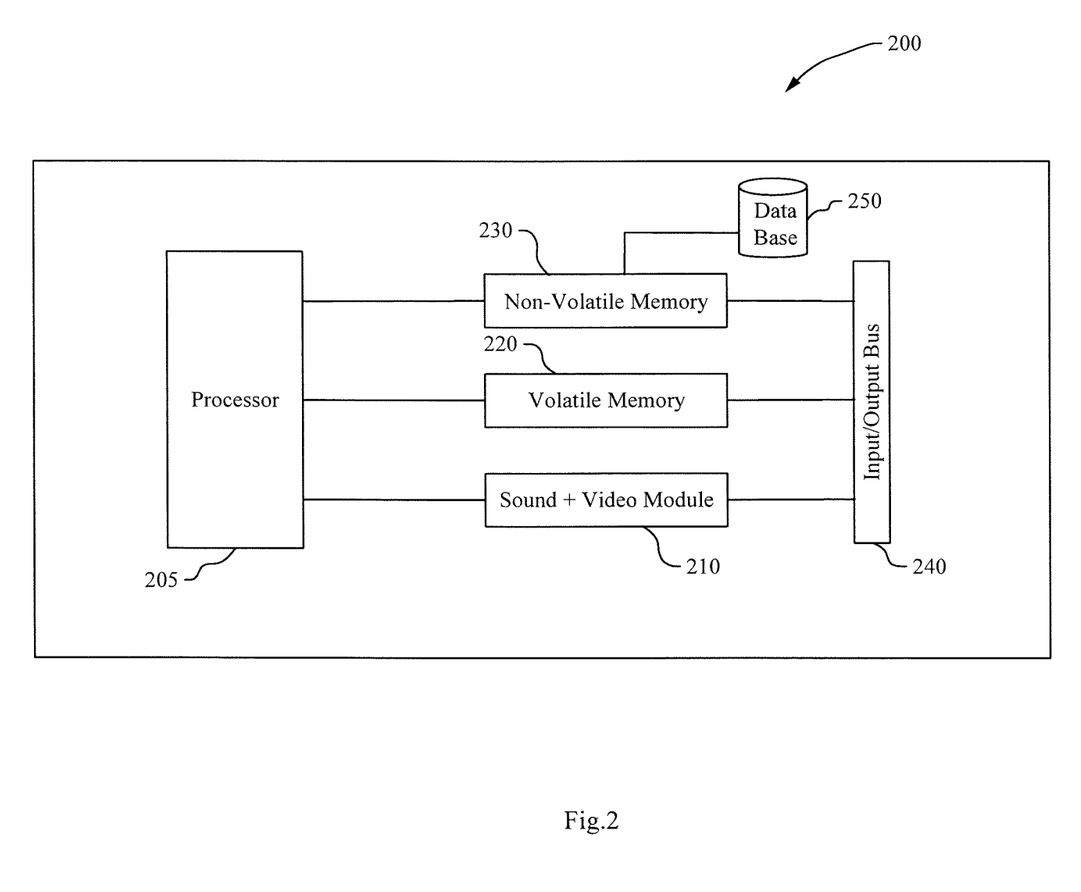
FIG. 2 is an illustration of a computing device.

FIG. 2 may be a sample server/workstation 200 that is physically configured to be part of the system. The server/workstation 200 may have a processor 205 that is physically configured according to computer executable instructions. It may also have a sound and video module 210 which assists in displaying video and sound and may turn off when not in use to conserve power and battery life. The server/workstation 200 may also have volatile memory 220 and non-volatile memory 230. The database 250 may be stored in the memory 220 or 230 or may be separate. The database 250 may also be part of a cloud of computing devices the same as or similar to the server/workstation 200 and may be stored in a distributed manner across a plurality of computing devices. There also may be an input/output bus 240 that shuttles data to and from the various user input devices such as the microphone, the inputs, etc. The input/output bus 240 also may control communicating with external networks 252, either through wireless or wired interfaces or other external network devices. Of course, this is just one embodiment of the server/workstation 200 and the number and types of such devices is limited only by the imagination.

The portable computing device 100, the server/workstation 200, or both, may be configured as an operator system useable for receiving and displaying data such as map and vehicle location information. Information received via the wireless network may be viewed at either a console in an operations center or at a Remote Foreman's Terminal.

Due to the unique operating conditions for the Remote Foreman's Terminal, a light-weight user interface may be used to deliver the specific functionality required. This user interface may not contain the full functionality of the full console version but rather may provide a simple, read-only access to a specific sub-set of functionality required by a Foreman from a remote location. This functionality itself may be reduced to accommodate for the potentially poor network conditions e.g. the data refresh rates of the Site Monitor may likely be reduced for the Remote Foreman's Terminal.

Because both truck terminals and the Remote Foreman's Terminal are either inherently limited in function or the operators have minimal time to devote to messaging, use of a customized message protocol can be used to address these issues and optimize communication.

In an embodiment, a dispatcher or operator may be able to group messages by machine type, by communication terminal type, or both. This allows the operator customize messages for a particular setting. For example, some terminals may have limited displays, so that abbreviated messages may be sent to that group of terminals while more complete messages may go to other terminals.

In another example, some terminals may only include only a few keys, prohibiting full text entry for a response. Messages may be sent with a selection of pre-determined answers so that the operator need only touch the button associated with the pre-determined answer. To illustrate, a message for a truck to return to the shop may include a canned responses such as "Confirmed" or "In an operation, will comply ASAP." In another illustration, a message such as "Data connection lost, confirm fuel supply," may have pre-determined answers of "fuel>1/2," "1/4<fuel<1/2," and "fuel<1/4." In yet another example, messages may be tailored to the terminal capabilities, that is, a terminal with eight programmable keys may have more detailed pre-determined responses than a terminal with 4 programmable keys.

In another embodiment, low bandwidth terminals may have the ability to load a number of text strings onto the terminal while docked so that the operator may only need to send a reference to one of several questions or statements and also send references to the text strings corresponding to selectable responses. Once selected at the terminal, only the reference needs to be sent back. That way, only minimal data in the form of references needs to be sent in either direction.

At an operator station, a user interface may accumulate messages sent over a wireless network to develop a database of standard queries/messages and their associated responses. Further, a user interface at the operator station may allow the operator to select outbound messages and acceptable responses from the database.

Figure 11:
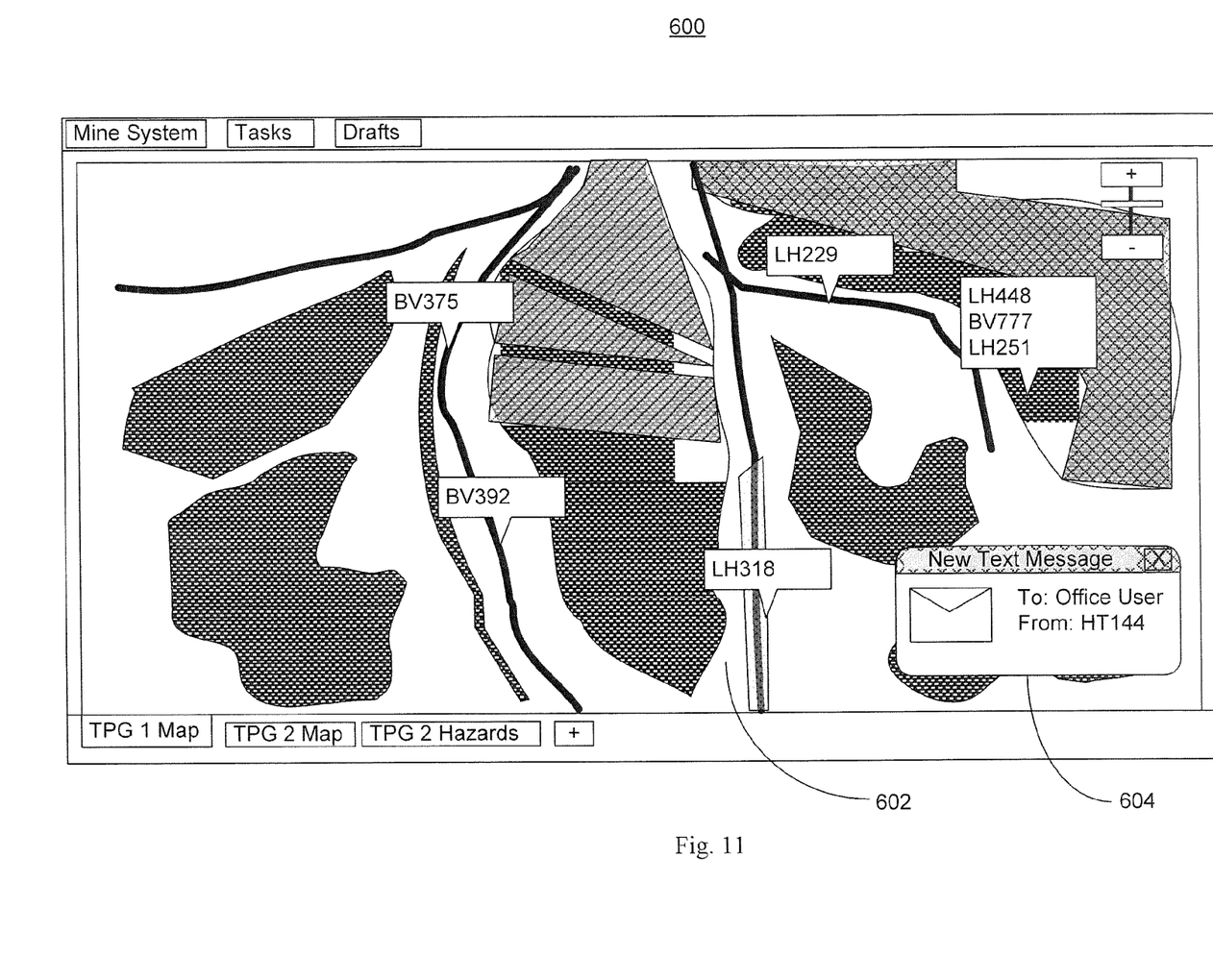
FIG. 11 is a screen shot of a map showing a messaging pop-up.

Turning to FIG. 11, a screen shot 600 of a map image 602 may include a pop-up 604 indicating a message is available for viewing. Even though the pop-up indicates a text message is available, as discussed above, the message, message format, and message protocol are unrelated to text messages as understood in a cellular telephone context. While cellular telephone text messages are limited to 140 characters and are carried, generally, on the control channel of a cellular telephone network, the messages of the currently illustrated system may be delivered over a variety of radio broadcast formats, such as WiFi, dedicated specialized mobile radio (SMR), wide area data networks, or in some cases, even cellular telephone data networks. In further contrast, as discussed above, the messages themselves may be coded for efficiency and may include a list, or coded list, of pre-determined responses.

Figure 12:
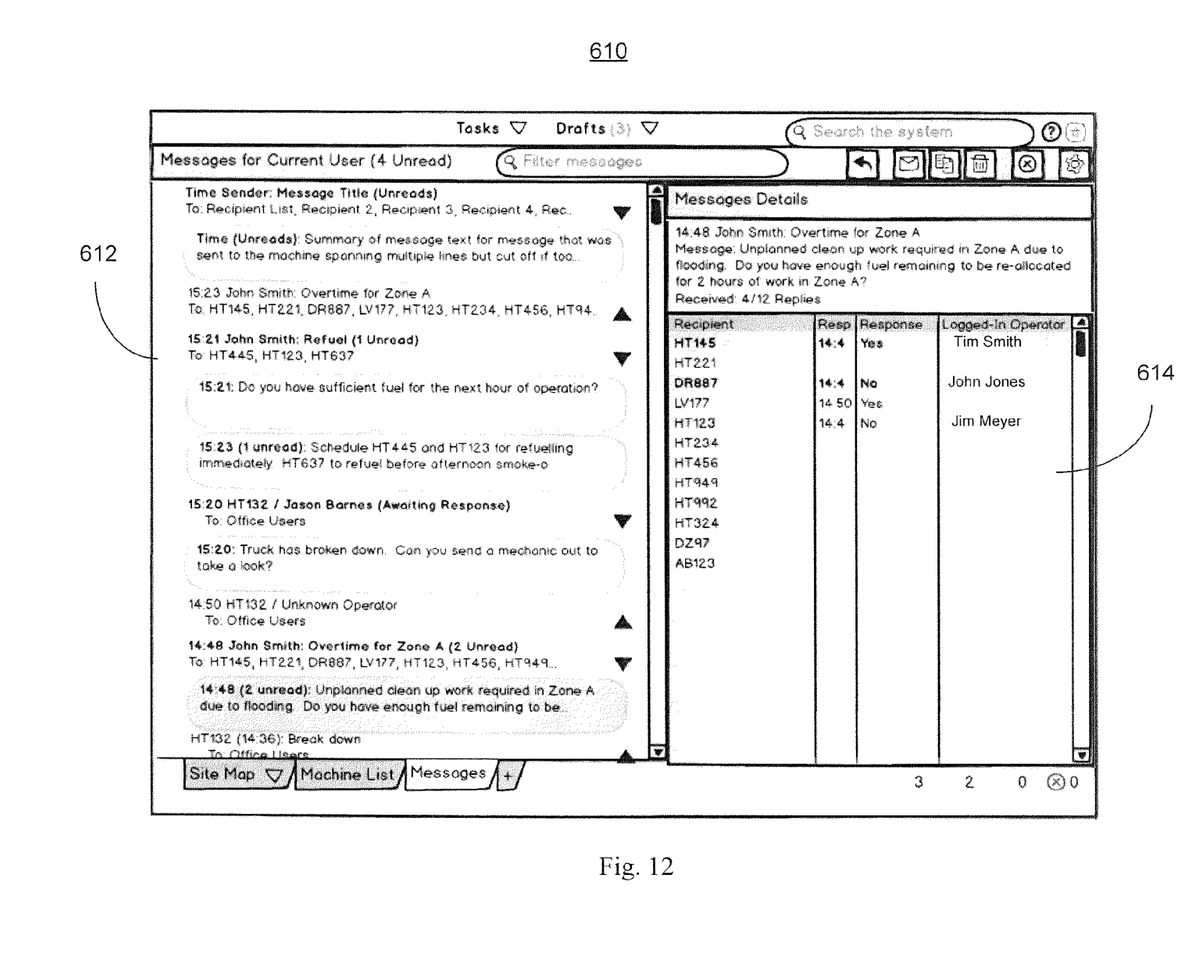
FIG. 12 is a screen shot showing a messaging window and a detailed message window.

The map 602 of FIG. 11 may show an operator console with the location of different pieces of equipment and the pop-up 604 may allow an operator to decide whether to open the message by selecting the pop-up 604 or by going to a message screen, shown in FIG. 12.

Turning to FIG. 12, a screen shot 610 of a message window 614 and a message detail window 614. The message window 612 may have a simple list of all messages with timestamps. The message detail window 614 may have a list of all related messages, especially one-to-many messages from a dispatcher or manager where a single outbound message may have a number of inbound responses. In an embodiment, the message detail window may filter responses according to expected response so that only anomalous or unexpected responses are displayed. For example, a request to report if fuel level is above or below one hour of operating time may group all "above" responses into a single line showing the number of response and only individually display "below" responses.

In an aspect, a mine equipment radio dispatching system may compose and group messages by equipment type or by terminal capabilities and format messages for each type or capabilities prior to transmission. The messages may also include pre-determined responses based on the capability of the terminal capability. In another aspect, a dispatcher or manager station may group messages by response and separately report only those messages whose content meets a filter criteria. Those messages whose content does not meet the filter criteria may be counted and the count displayed, but may not be displayed individually.

Returning to FIG. 3 is an illustration a view of a Travel Progress Monitor (TPM) timeline 300 of a portion of the mining environment. The TPM timeline 300 illustrates the progress of machines, e.g., machine 308 travelling from a source, e.g., source 301 (shown on the right) towards a destination, e.g., destination 302 (shown on the left). The progress of a machine 308 may be clearly indicated via a marker 310 on the timeline along with the estimated time until arrival. A machine 304 in active use at the destination 302 may be shown to the left of the destination 302, with the current action indicated. Any estimated times that have been exceeded may increment to indicate how far they have been exceeded by and display a "+" in front (e.g. "+02:17"), for example, machines that have arrived at the destination 302 but are queued for loading.

Figure 3:
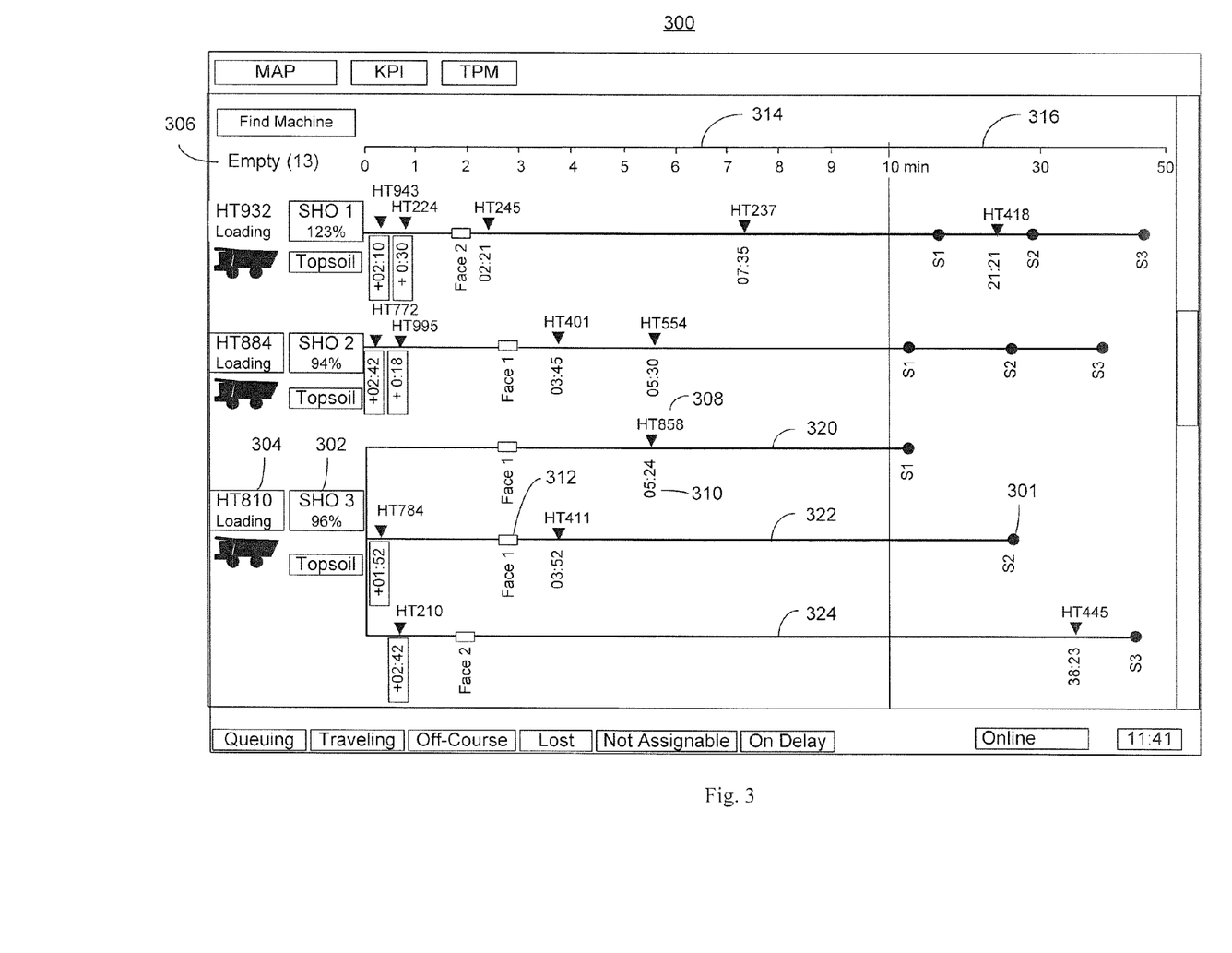
FIG. 3 is an illustration a travel progress monitor timeline view of a portion of the mining environment.

The timeline 300 displayed contains two linear sections. The primary section 314 illustrates the last 10 minutes of travel for a machine with a fine-level granularity, while the secondary section 316 illustrates the remaining travel time of the machine with a broad granularity. That is, the last 10 minutes of travel are shown in more detail than the rest of the travel time as it may be considered the most important or of the most interest. These last 10 minutes of travel 314 are displayed on the screen to ensure they are placed within the prime viewing position for the user. The amount of real estate used by the primary 314 and secondary 316 sections of the timeline may be adjusted by dragging the handle at the boundary of the two areas within the timeline.

Figure 4:
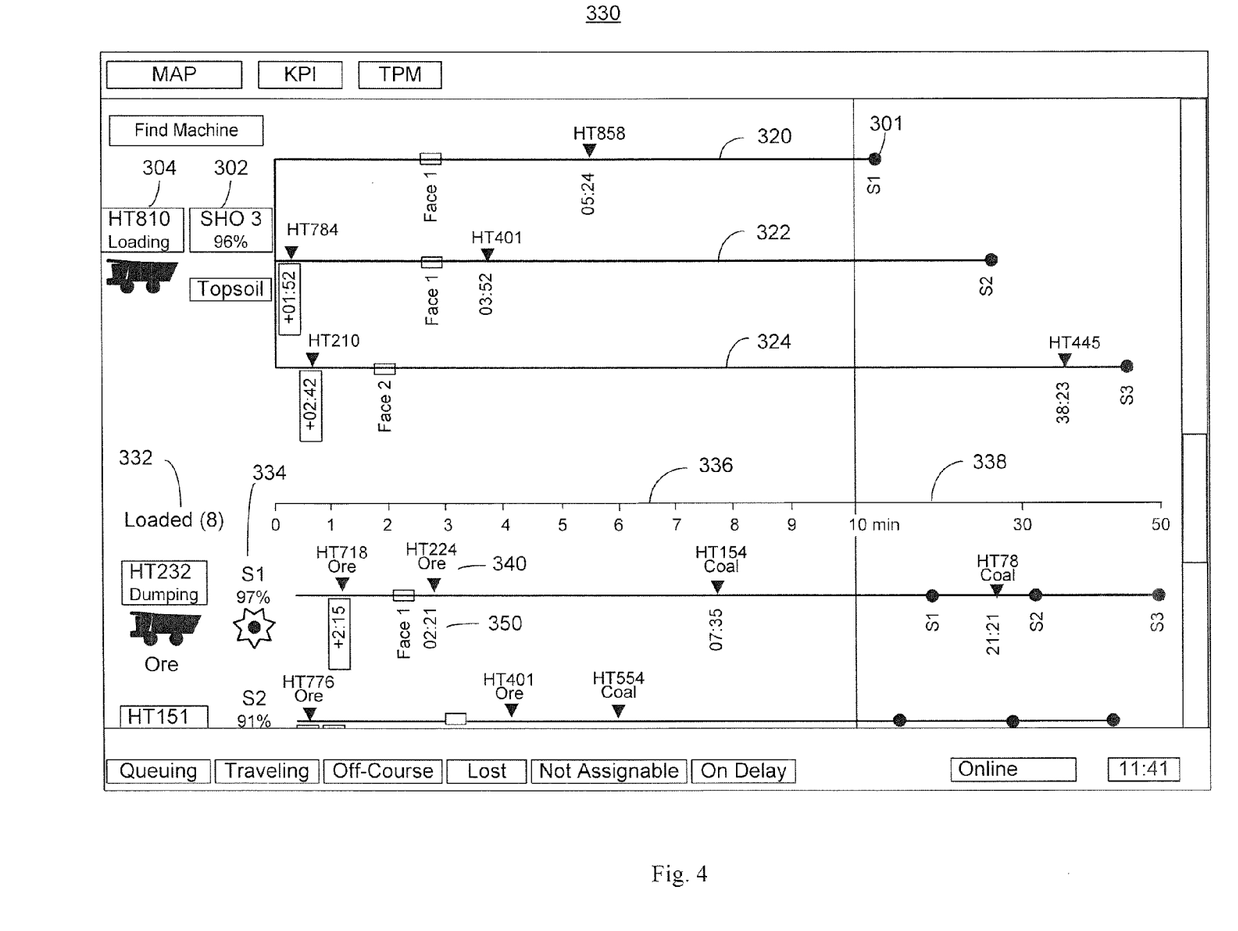
FIG. 4 is an illustration of the travel progress monitor timeline view of FIG. 7 showing a different portion of the mining environment.
Figure 5:
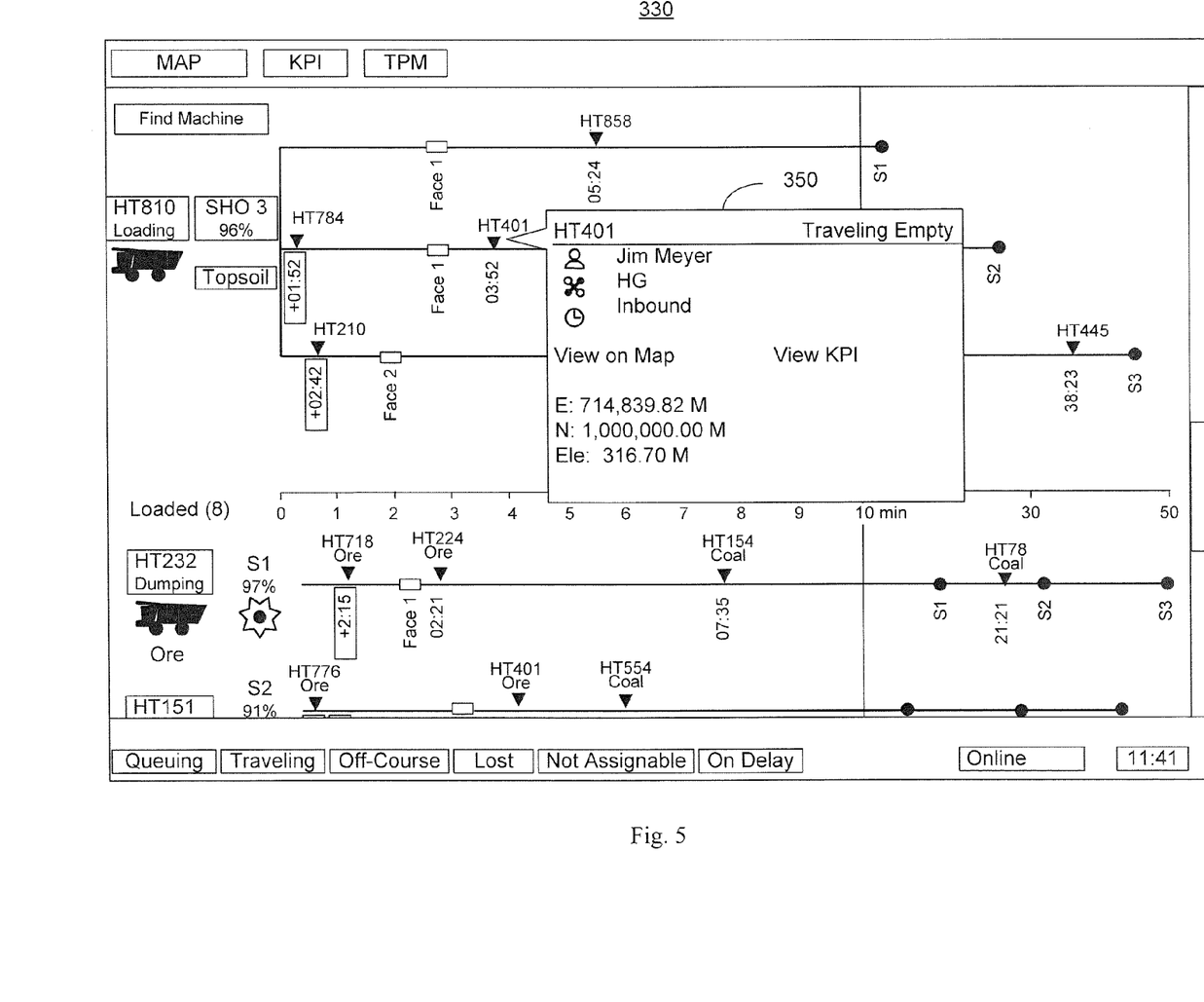
FIG. 5 is an illustration of a display of a travel progress monitor timeline view showing additional information about a selected vehicle.
Figure 6:
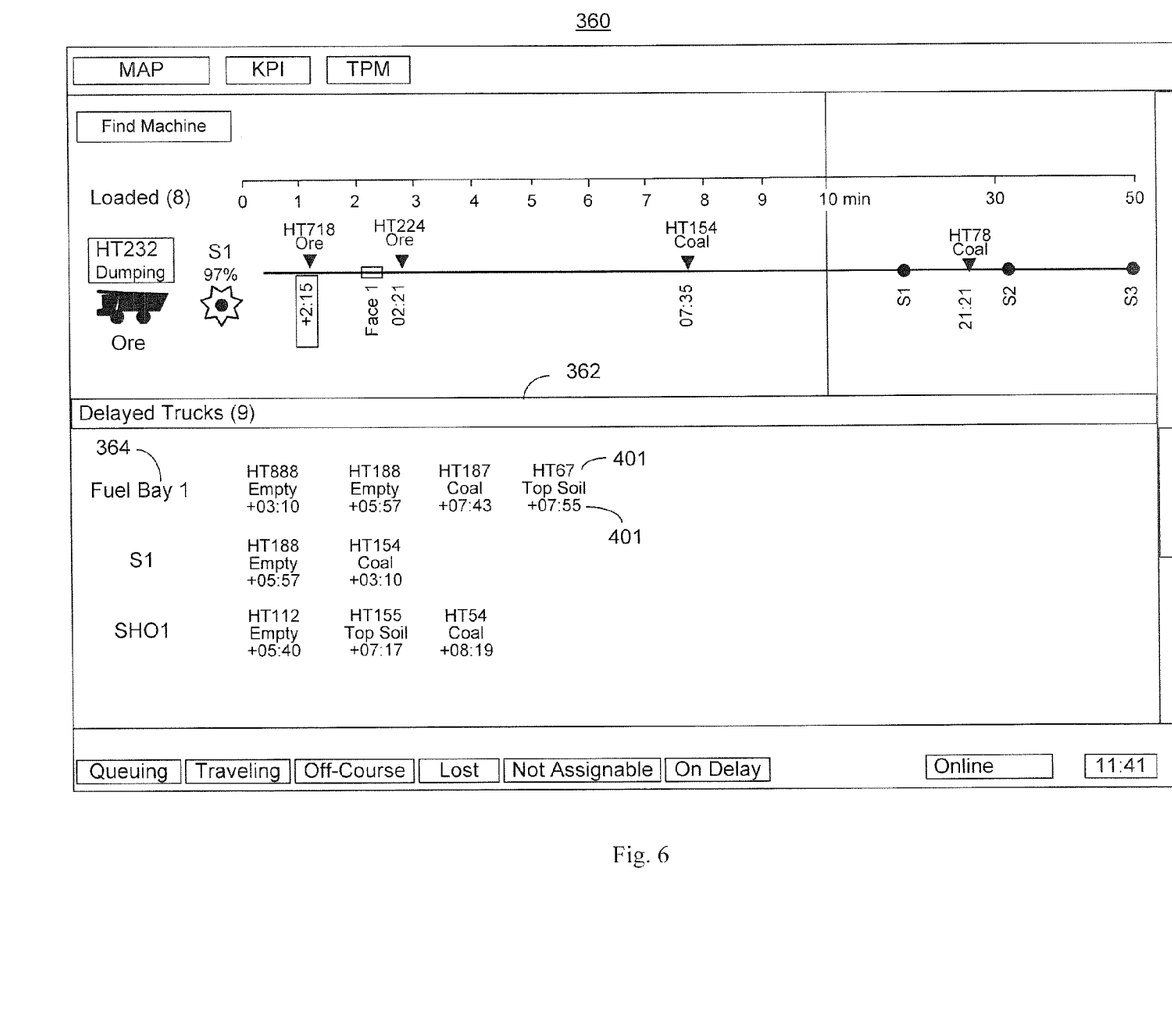
FIG. 6 is an illustration of a display of a travel progress monitor showing delayed vehicles.

If a timeline displays machines that have multiple source locations, that timeline may display the relative positions of those source locations according to the estimated time to travel from those sources. It should be noted that this does not imply that they have similar or overlapping paths, simply that there are machines travelling from these sources. See, for example, the upper timeline associated with destination SHO 1 (Shovel 1).

Where there are multiple sources presented on a timeline, an icon (not depicted) may be selected to expand the timeline to show each source individually, e.g., showing individual timelines 320, 322, and 324 associated with SHO 3 and sources S1, S2, and S3. The machines may appear in the appropriate area of the Travel Progress Monitor timeline 300 depending on their current state. The number of machines displayed within an area may be indicated by a label, e.g., label for empty area 306 in the title bar. The TPM timeline 300 may have multiple sections that are accessible by scrolling through the different areas. FIGS. 4-6 illustrate additional areas shown in the TPM timeline 300.

As discussed with respect to FIG. 3, trucks travelling empty may appear in the Empty area 306 travelling towards their assigned loader. They may have a time marker indicating the estimated time until their arrival. As trucks pass through waypoints 312 these estimates are updated to ensure the most accurate estimate possible.

Once a truck has arrived and stopped at a loader their status may be updated to indicate that they have arrived and are queuing. A number of trucks may be queuing for a loader at any one time. Once the loader becomes available, a truck 304 may progress to the Loading state and they may be moved on the display to the left of the loader 302 to allow the utilization of the loader to be illustrated.

To ensure the most important loaders are seen first, the loaders are presented according to priority, with the largest loading tools presented at the top of the displayed list. Each loader has their utilization percentage and may also include estimated load time remaining presented. If a machine goes on delay while travelling empty, they may be removed from the Empty area and moved to the Delayed area of the Travel Progress Monitor, see FIG. 6.

If a loading tool is selected in the Empty area, the following information may be presented in a summary popup: the material being loaded and the current mining block, the destination, and whether the loading tool is over trucked, correctly trucked, under trucked, or has an indeterminate trucking level.

If a truck that is travelling is selected, a summary popup may present additional information about where the truck is coming from, its location, load status (empty or loaded), and additional options for viewing. See, e.g., popup 350 of FIG. 5.

Turning to FIG. 4, another view 330 of timeline 300 is illustrated. View 330 shows the timeline 300 scrolled to show the bottom of the empty truck area 306 and the beginning of the loaded truck area 332. Trucks travelling loaded may appear in the Loaded area travelling towards their assigned processor with an indication of the type of material they are carrying. They may have a time marker indicating the estimated time until their arrival. As above, the source, for example, the loader 302 of the empty truck area, is illustrated on the right of the screen and the destination, for example, processor 334, is illustrated on the left.

Once a truck has arrived and stopped at a processor 334 their status may be updated to indicate that they have arrived and are queuing. A number of trucks may be queuing for a processor 334 at any time. Once the processor 334 becomes available, a truck may progress to the Dumping state and they may be moved on the display to the left of the processor to allow the utilization of the processor 334 to be illustrated. A number of trucks may be dumping at any time (depending on the processor). This may be illustrated by a stacked list of trucks on the left-hand side beside the processor.

To ensure the most important processors are seen first, the processors are presented according to priority, with the largest processors presented at the top of the displayed list above the dumps. Each processor has their utilization percentage (if available) and may also show an estimated service time remaining.

If a processor is selected in the Loaded area, destination information may be presented in a summary popup. If a truck travelling loaded is selected, the following information may be presented in a summary popup: payload size and mining block.

Unlike the Empty and Loaded areas, if a truck goes on delay while at a station it may remain displayed against that station (along with appearing in the Delayed area) with their delay status clearly indicated along with the estimated time of their delay.

Turning to FIG. 6, another view 360 of the timeline 300 is illustrated. If a machine goes on delay while travelling, they may be removed from the Empty area 306 or Loaded area 332 and moved to the Delayed area 362 of the Travel Progress Monitor timeline 300.

In an embodiment, trucks may flagged themselves as being on delay and may subsequently be presented in the Delayed Trucks area 362. Each truck may be placed beside a marker indicating its last known location, for example, fuel bay 364. If a truck is not positively identified as being on delay, its last known location may be used. For example, if the truck was known to be at a loader when it went on delay, it would appear next to a marker for that loader.

Trucks that have an unknown status may be presented in an Unknown area similar to that of the delayed truck area 362. Each truck may be placed beside a marker indicating its last known location. If no location is known, the truck may be placed against an Unknown marker within that area.

Colors may be used on either the timeline view or an overhead map view to indicate states. The following states and their respective colors may be used for trucks:

Queuing (green) (i.e. truck has stopped on a final road segment)
Travelling/Dumping/Loading (black in bright mode, white in dark mode)
Off-Course (orange)
Lost (pink)
Not Assignable (red)
On Delay (grey)

The following states are represented for loading tools and processors: Servicing (white), On Delay (grey).

These status indicators and colors are only illustrative of an embodiment and other status indicators and colors may be used to suit a particular application or installation.

In an embodiment, the list of machines displayed may be filtered by both Fleet and Assignment group using a Filter option. Only machines that form part of the selected fleet or group would then be displayed in the Travel Progress Monitor.

Figure 7:
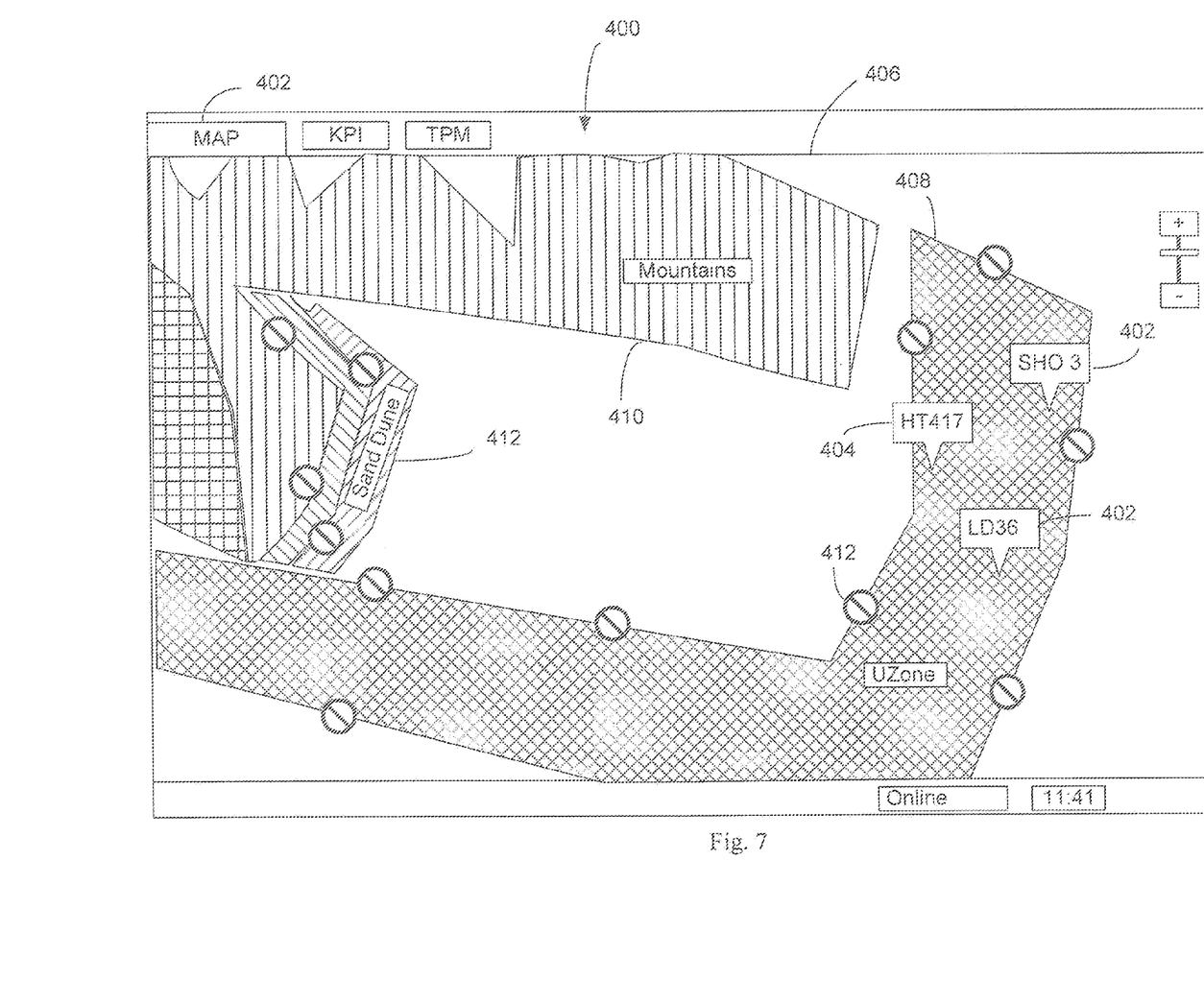
FIG. 7 is an illustration of an overhead map of a portion of the mining environment.

FIG. 7 is an illustration of an overhead map 400 of a portion of the mining environment. This may be viewed by selecting the Map navigation option 402 in the title bar area of any location-related screen. The overhead map 400 may displayed separately or may be displayed concurrently with the TPM timeline 300. The map 400 presented may show a fleet-based monitoring view of the site and may display the following: machines 402, trucks 404, site boundary 406, mining blocks 408, features 410, and hazards 412, although this is not an exhaustive list.

The locations and other information presented on the map 400 may be updated dynamically as changes are detected, particularly machine locations and status colors. By default, the map may be zoomed to show the current mine boundary.

Figure 8:
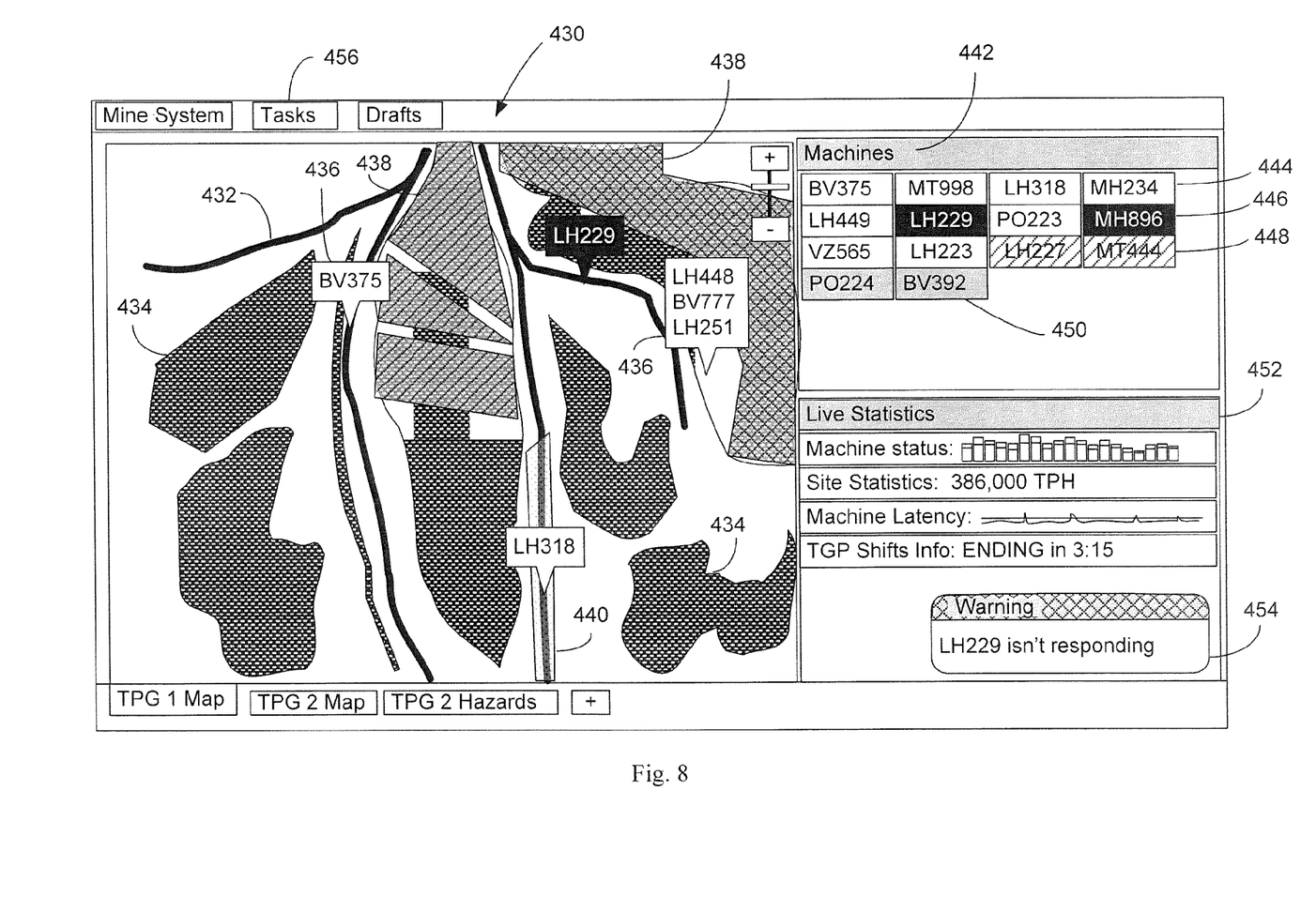
FIG. 8 is an illustration of a display of an overhead map showing vehicle locations, hazard areas, machine status indicators, and a warning.

FIG. 8 is an illustration of a display of an overhead map 430 showing vehicle locations, hazard areas, machine status indicators, and a warning. The map 430 may include roads 432, mining blocks 434, hazards 438, and speed zones 440. As discussed above, the information on the map 430 may be changed dynamically. For example, the speed zone 440 may be a road area that was recently watered down and may have a reduced speed until the surface has sufficiently dried to allow normal operating speeds to resume.

A machines area 442 may indicate a complement of machines and their status. For example, a first color 444 normal operation, a second color 446 may indicate a machine that should be working but isn't. A third color 448 may indicate a machine that is working below capacity, for example, its engine is hot and the machine is working at a reduced rate. Another color 450 may indicate machines that are shut down or their onboard computers are shut off. Any machine may be selected to retrieve additional status for that machine.

A statistics area 452 may be a summary of machine operating actual vs. capacity, site statistics, and other operations-related information. A warning area 454 shows machine-specific information that meets a pre-selected criteria for flagging. A tasks tab 456 may be used to access additional functions of the mining operations control environment.

Figure 9:
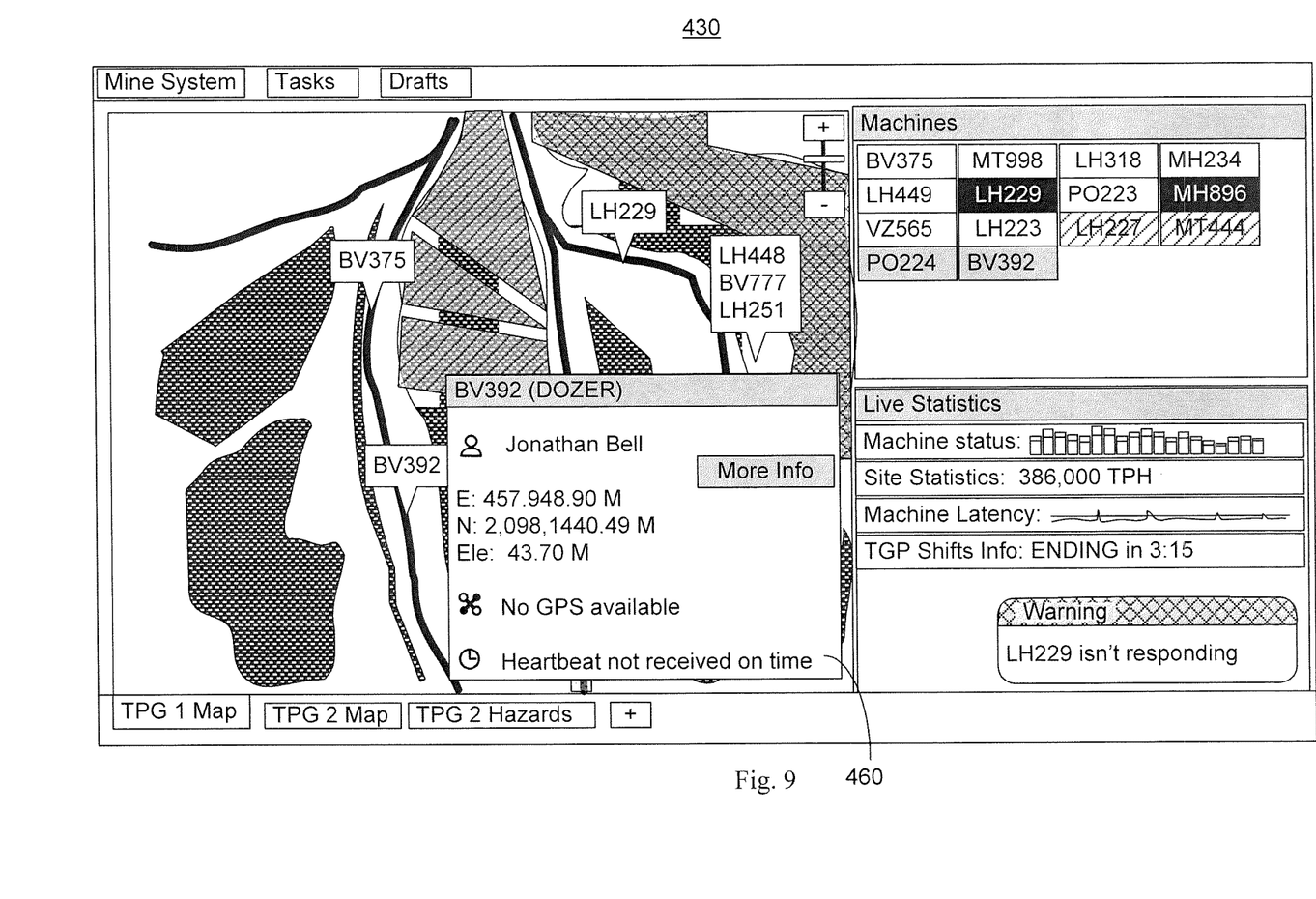
FIG. 9 is an illustration of the display of FIG. 4 showing additional information about a selected vehicle.

FIG. 9 illustrates the map 430 of FIG. 8 showing a popup 460 with additional information about a selected vehicle.

INDUSTRIAL APPLICABILITY

Figure 10:
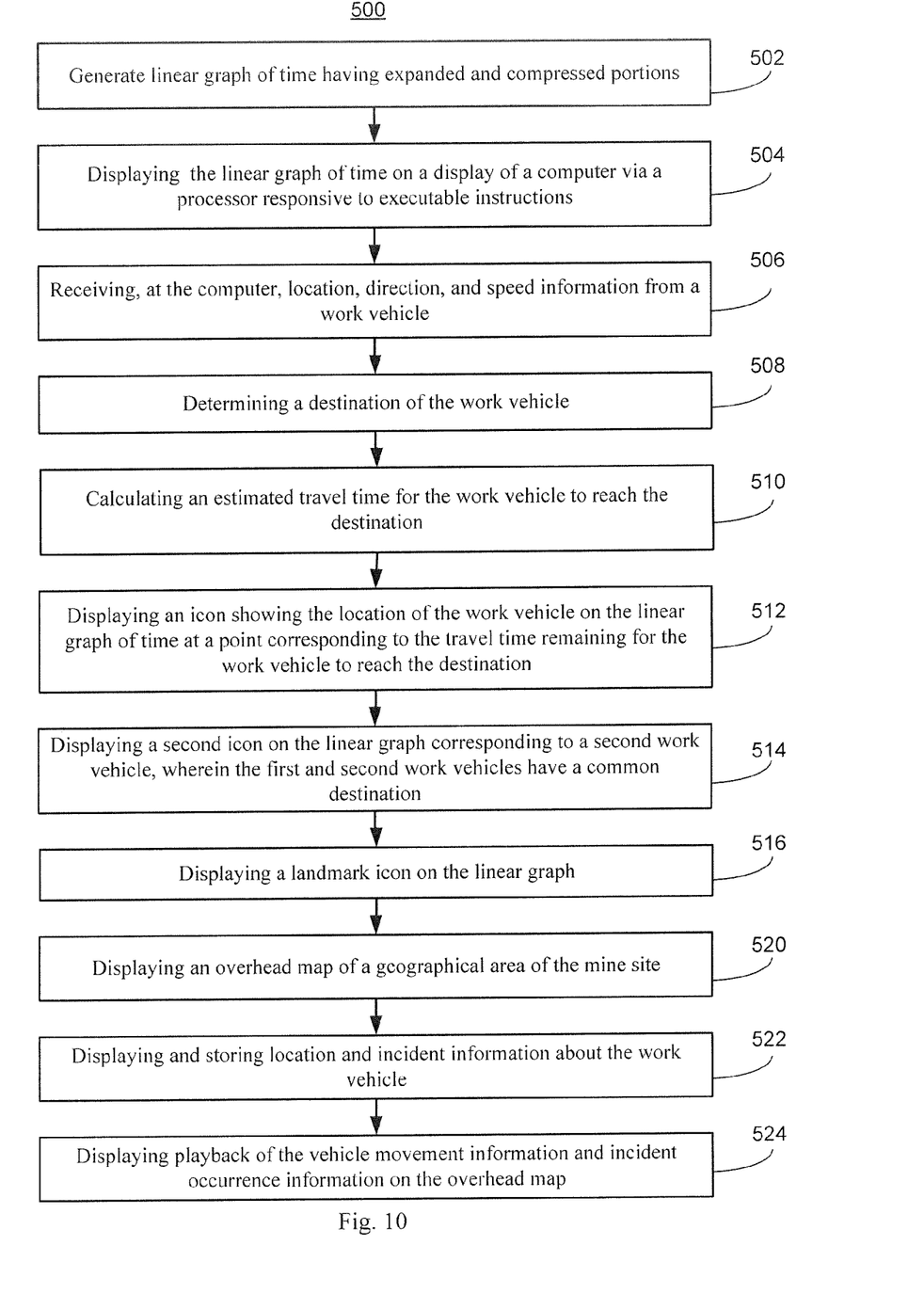
FIG. 10 is a flow chart of a method of using a computing device to create a user interface for a mining operation.

FIG. 10 is an illustration of a method 500 of using vehicle location information in a mining environment. At block 502 a timeline 322 may be generated at a processor of a server/workstation 200 or portable computing device 100. The timeline 322 having an expanded portion 314 adjoining and not overlapping a compressed portion 316, the compressed portion 316 representing more time per unit length than the expanded portion, the timeline 322 having a first end 301 corresponding to a first location of a first work function and a second end 302 corresponding to a second location of a second work function.

At a block 504, the timeline may be displayed on a display of a server/workstation 200 or portable computing device 100 responsive to executable instructions stored in a memory accessible by the server/workstation 200 or portable computing device 100. FIGS. 3-6, discussed above, illustrate various features of the timeline 322 in conjunction with the display of additional timelines.

At a block 506, at least some combination of a location, direction, and speed information are received from a work vehicle at the computer, that is, the server/workstation 200 or portable device 100. The location-related information may come from an onboard Global Positioning System, from signpost location devices, or may be calculated using radio signal triangulation techniques, known in the industry.

At a block 508, a destination of the work vehicle may be determined. The destination may correspond to one of the first location and the second location associated with the timeline 322. In the exemplary embodiment, the first and second locations are a loading point and a dumping point for a dump truck or other material transport vehicle. If the truck is empty, its destination is an assigned loader site, such as a shovel 302. If the truck is loaded, its destination is an assigned processing point or dump site 301. On board sensors, operator input, a dispatcher, or on-site observers may be used to indicate load status, destination information, or both.

If the destination is a location other than one of those designated for the current timeline 322, another timeline, e.g., timeline 324 may be generated accordingly.

At a block 510, an estimated travel time for the work vehicle to reach the destination may be calculated. In an embodiment, the current location and known location of the destination may be used to determine the remaining distance and the current speed may be used to calculate the remaining travel time. Alternatively, several mechanisms can be used to determine the remaining travel time. For example, using the current location and known speed limits for remaining segments of the route may be more accurate for calculating travel time to the destination rather than simply using current speed. Such calculations also allow for determining if the vehicle is ahead or behind an expected arrival time.

At block 512, an icon may be displayed showing the location of the work vehicle on the timeline at a point on the timeline corresponding to the travel time remaining for the work vehicle to reach the destination. Unlike a simple distance-based display, showing the location based on travel time to destination quickly allows a dispatcher, field supervisor, or other personnel to identify potential bottlenecks while there is still time to divert vehicles to other destinations for better balance.

In an embodiment, the icon may be colored to correspond to a condition of the vehicle, as discussed above, or may be colored to highlight a status of the vehicle such as off-track, queued, and traveling. The queued status may also include showing a time on station at the destination.

At block 514, additional vehicles may be displayed using separate icons showing vehicles on the same timeline as the first work vehicle. In different embodiments, the different vehicles may have a common destination and different starting points.

At block 516, a landmark icon 312 may be displayed on the timeline 322. The location of the landmark icon may be placed at a location calculated as the travel time for the work vehicle moving at the speed limit or limits from that point for the work vehicle. When a vehicle passes the landmark 312, its expected time to arrival may be updated according to the known travel time from that location. In some embodiments, different vehicles may have different speed limits, so the estimated time to arrival may be adjusted by vehicle type and different vehicles may have different times from the same landmark.

At block 520, an overhead map 430 of a geographic area of the mine site may also be displayed. The overhead map 430 may be either a satellite image or a "street map" and may include overlays indicating one or more of roads 432, mining blocks 434, hazards 438, etc. In an embodiment, a tool may be used to create and geographically locate hazard indicators on the map 430 corresponding to physical areas at the mine site. Additionally, criteria and/or alerts associated with the designated areas may be set for use when vehicles travel in those vicinities. For example, an alert may be sent to a driver who is exceeding a speed limit or who is approaching a hazard area based on the boundaries and rules established during the map creation or maintenance.

At block 522, an icon of the work vehicle may be displayed on the overhead map 430 showing a physical location of the work vehicle and may also display incident information at a location on the map where the incident occurred. For example, all vehicle travel may be displayed and stored along with any incident information. For example, vehicles may be monitored when traveling at too high a speed or when passing too close to each other or a hazard.

At block 524, vehicle movement information and incident occurrence information over a specified prior time period may be retrieved from memory and played back in order to confirm violations or for training of operators.

The ability to capture, store, and replay real time events at a mine site, as well as being able to graphically display the time to arrival of work vehicles at a destination gives mine operators and improved ability to better manage the very expensive resources at their disposal. By avoiding bottlenecks and dead time at destinations, machines such as loaders can be kept in operation while keeping vehicles on the road delivering material.

Allowing hazard and alert areas to be graphically created on a map and then storing vehicle traffic and incidents for replay gives managers tangible evidence for both instruction and discipline, creating a safer and more efficient work site.

We claim:

1. A method of using vehicle location information in a mining environment, the method comprising:
generating, at a processor of a computer, a timeline having an expanded portion adjoining and not overlapping a compressed portion, the compressed portion representing more time per unit length than the expanded portion, the timeline having a first end corresponding to a first location of a first work function and a second end corresponding to a second location of a second work function;
displaying the timeline on a display of the computer via the processor responsive to executable instructions stored in a memory accessible by the computer;
receiving a location, a direction, and speed information from a work vehicle at the computer;
determining a destination of the work vehicle as one of the first location and the second location;
calculating an estimated travel time for the work vehicle to reach the destination; and
displaying an icon showing the location of the work vehicle at a point on the timeline corresponding to the estimated travel time remaining for the work vehicle to reach the destination.

2. The method of claim 1, further comprising displaying a second icon showing a second work vehicle on the timeline showing the work vehicle, wherein the work vehicle and the second work vehicle have a common destination.

3. The method of claim 1, wherein displaying the icon comprises displaying a color of the displayed icon corresponding to a condition of the work vehicle.

4. The method of claim 3, wherein the condition is one of an off-track status, a queued status, and a traveling status.

5. The method of claim 4, wherein the queued status includes a time on station at the destination.

6. The method of claim 1, further comprising displaying an icon for a landmark on the timeline, the location of the landmark icon calculated as the estimated travel time for the work vehicle from the landmark when operating at a nominal speed for the work vehicle.

7. The method of claim 1, wherein the work vehicle is a dump truck, the destination for an empty work vehicle is a loader site and the destination for a loaded work vehicle is a dump site.

8. The method of claim 1, further comprising;
displaying a map of a geographic area of the mining environment; and
displaying an expanded icon of the work vehicle on the map showing a physical location of the work vehicle and a displaying information corresponding to an incident at a location on the map where the incident occurred.

9. The method of claim 8, further comprising:
storing vehicle movement information and incident occurrence information; and
displaying playback of the vehicle movement information and incident occurrence information over a specified prior time period.

10. The method of claim 9, further comprising:
creating hazard indicators graphically located on the map corresponding to physical areas at the mining, environment;
setting a criteria associated with each hazard indicators; and
sending the work vehicle an alert associated with a hazard indicator when the work vehicle meets the criteria associated with the hazard indicator.

11. The method of claim 1, further comprising displaying an incident indicator on the timeline at a time point of the timeline associated with an incident and displaying operator information for an operator of the work vehicle.

12. A system for using vehicle location information in a mining environment, the system comprising:
an operator system including:

a network connection configured to receive location information about the vehicle operating in the mining environment;

a processor configured to execute program instructions;

a user interface having a display and input device; and a memory storing computer executable instructions that, when executed on the processor, cause the operator system to:

generate a timeline having an expanded portion adjoining and not overlapping a compressed portion, the compressed portion representing more time per unit length than the expanded portion, the timeline having a first end corresponding to a first location of a first work function and a second end corresponding to a second location of a second work function;

display the timeline on the display;

receive a location, a direction, and speed information from a work vehicle;

determine a destination of the work vehicle as one of the first location and the second location;

calculate an estimated travel time for the work vehicle to reach the destination; and display, on the display of the user interface, an icon showing the location of the work vehicle at a point on the timeline corresponding to the estimated travel time remaining for the work vehicle to reach the destination.

13. The system of claim 12, wherein the memory comprises further instructions that, when executed on the processor, cause the operator system to:

display, on the display of the user device, a map of a geographic area of the mining environment; and display, on the display of the user device, an expanded icon of the work vehicle on the map showing a physical location of the work vehicle and information corresponding to an incident at a location on the map where the incident occurred.

14. The system of claim 13, wherein the memory comprises further instructions that, when executed on the processor, cause the operator system to:

store vehicle movement information and incident occurrence information; and display, on the display of the user device, playback of the vehicle movement information and incident occurrence information over a specified prior time period.

15. The system of claim 14, wherein the memory comprises further instructions that, when executed on the processor, cause the operator system to:

create hazard indicators graphically located on the map corresponding to physical areas at the mining environment;

set a criteria associated with each hazard indicator; and send the work vehicle an alert associated with a hazard indicator when the work vehicle meets the criteria associated with the hazard indicator.

16. The system of claim 12, wherein the memory comprises further instructions that, when executed on the processor, cause the operator system to:

display, on the display of the user device, an incident indicator on the timeline at a time point of the timeline associated with an incident; and display, on the display of the user device, operator information for an operator of the work vehicle.

17. The system of claim 12, wherein displaying the icon includes displaying a color of the displayed icon corresponding to a condition of the work vehicle.

18. The system of claim 17, wherein the condition is one of an off-track status, a queued status, and a traveling status.

19. The system of claim 18, wherein the queued status includes a time on station at the destination.

20. The system of claim 12, wherein the work vehicle is a dump truck, the destination for an empty work vehicle is a loader site and the destination for a loaded work vehicle is a dump site.

* * * * *